(12) United States Patent
Brucker et al.

(10) Patent No.: US 10,608,518 B2
(45) Date of Patent: Mar. 31, 2020

(54) TRANSPORT DEVICE IN THE FORM OF A LONG STATOR LINEAR MOTOR

(71) Applicant: B&R INDUSTRIAL AUTOMATION GMBH, Eggelsberg (AT)

(72) Inventors: Michael Brucker, Weissenkirchen (AT); Franz Spanlang, Linz (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 16/227,885

(22) Filed: Dec. 20, 2018

(65) Prior Publication Data
US 2019/0199189 A1    Jun. 27, 2019

(30) Foreign Application Priority Data
Dec. 22, 2017    (EP) .................................... 17210128

(51) Int. Cl.
*B65G 47/94*    (2006.01)
*B65G 54/02*    (2006.01)
(Continued)

(52) U.S. Cl.
CPC ............ *H02K 41/031* (2013.01); *B60L 13/03* (2013.01); *B60M 7/00* (2013.01); *B65G 37/02* (2013.01); *B65G 54/02* (2013.01)

(58) Field of Classification Search
None
See application file for complete search history.

(56) References Cited

U.S. PATENT DOCUMENTS

| 3,631,806 A | 1/1972 | Barthalon |
| 4,800,999 A | 1/1989 | Matsuo |

(Continued)

FOREIGN PATENT DOCUMENTS

| DE | 10 2012 205060 | 10/2013 |
| EP | 1 123 884 | 8/2001 |

(Continued)

OTHER PUBLICATIONS

Beckhoff, "Benefit from intelligent drive technology. XTS. The extended Transport System", XP055477367, Beckhoff.com, Internet: URL:https://download.beckhoff.com/download/Document/catalog/XTS_Beckhoff_e.pdf {retrieved on May 22, 2018}, Sep. 30, 2015.

(Continued)

*Primary Examiner* — Kavel Singh
(74) *Attorney, Agent, or Firm* — Greenblum & Bernstein, P.L.C.

(57) ABSTRACT

To provide a simple and flexibly usable transport device in the form of a long stator linear motor, which enables a movement of a transport unit of the transport device in several different planes, it is provided according to the invention that a transition segment including a continuous-flow conveyor having a longitudinal axis is provided, adjoining the starting point or the ending point of the transport track in the longitudinal direction, for transporting the transport unit in a direction of movement extending along the longitudinal axis, wherein the continuous-flow conveyor is provided to move the transport unit in the direction of movement at least sectionally in a conveying plane deviating from the movement plane of the transport track.

12 Claims, 9 Drawing Sheets

(51) Int. Cl.
  *H02K 41/03* (2006.01)
  *B65G 37/02* (2006.01)
  *B60M 7/00* (2006.01)
  *B60L 13/03* (2006.01)

(56) References Cited

U.S. PATENT DOCUMENTS

| | | | |
|---|---|---|---|
| 5,673,783 A * | 10/1997 | Radant | B65B 5/101 |
| | | | 198/418.6 |
| 6,196,377 B1 * | 3/2001 | Brown | B65G 17/12 |
| | | | 198/409 |
| 6,876,107 B2 | 4/2005 | Jacobs | |
| 7,036,654 B2 * | 5/2006 | Frost | B65G 47/248 |
| | | | 198/406 |
| 9,611,107 B2 | 4/2017 | Wernersbach et al. | |
| 9,923,444 B2 * | 3/2018 | Kleinikkink | H02K 41/0358 |
| 10,118,775 B2 * | 11/2018 | Walter | H02K 41/02 |
| 10,246,266 B2 * | 4/2019 | Weber | B60L 13/03 |
| 2013/0074724 A1 | 3/2013 | Kings et al. | |
| 2015/0047295 A1 | 2/2015 | Van De Loecht | |
| 2016/0380562 A1 * | 12/2016 | Weber | H02K 41/03 |
| | | | 310/12.11 |

FOREIGN PATENT DOCUMENTS

| | | |
|---|---|---|
| EP | 3 031 756 | 6/2016 |
| WO | 2004/103792 | 12/2004 |
| WO | 2013/143783 | 10/2013 |
| WO | 2014/047104 | 3/2014 |
| WO | 2015/042409 | 3/2015 |

OTHER PUBLICATIONS

Anonymous, "CDA—Revolutionary linear transport system", XP055477867, Internet: URL://www.controlsdrivesautomation.com/page_649072.asp {retrieved on May 23, 2018], Sep. 27, 2015.
Europe Search Report/Office Action conducted in Europe Appln. No. 17210128 (dated May 24, 2018) (w/ partial machine translation).

* cited by examiner

TRANSPORT DEVICE IN THE FORM OF A LONG STATOR LINEAR MOTOR

CROSS-REFERENCE TO RELATED APPLICATIONS

The present application claims priority under 35 U.S.C. § 119(a) of European Patent Application No. EP 17210128.9 filed Dec. 22, 2017, the disclosure of which is expressly incorporated by reference herein in its entirety.

BACKGROUND OF THE INVENTION

1. Field of the Invention

The invention relates to a transport device in the form of a long stator linear motor, comprising at least one transport unit and a transport track composed of a plurality of transport segments arranged consecutively in the longitudinal direction, having a starting point and an ending point, along which the transport unit can be moved in the longitudinal direction along a movement path predefined by the transport segments, wherein the transport track comprises at least one curved transport segment having a curved movement path that is located in a two-dimensional plane, wherein the two-dimensional plane defines a plane of movement in which the transport unit can be moved along the entire transport track.

2. Discussion of Background Information

Essentially all modern production equipment makes it necessary to move parts or components between individual handling or production stations by way of transport devices, including over extended transport distances. A multitude of transport or conveying devices are known for this purpose. Frequently, continuous-flow conveyors in various designs are used for this purpose. Conventional continuous-flow conveyors are conveyor belts in various embodiments in which a rotational movement of an electric drive is converted into a linear movement of the conveyor belt. Such conventional continuous-flow conveyors significantly limit flexibility, and in particular it is not possible to individually transport single transport units. To remedy this situation and meet the requirements of modern, flexible transport devices, what are known as long stator linear motors (LLM) are being used to an increased extent, displacing conventional continuous-flow conveyors.

In the case of a long stator linear motor, a plurality of electric drive coils forming the stator are arranged next to one another along a transport track in a stationary manner. A number of drive magnets, either in the form of permanent magnets or an electric coil or a squirrel cage winding, are arranged on a transport unit and cooperate with the drive coils. The (electro)magnetic fields of the drive magnets and the drive coils cooperate so as to generate a propulsive force for the transport unit, which moves the transport unit forward. The long stator linear motor can be implemented as a synchronous machine, either in self-excited or separately excited form, or as an asynchronous machine. By activating the individual drive coils for controlling the magnetic flux, the magnitude of the propulsive force is influenced, and the transport unit can be moved along the transport track in the desired manner. It is also possible to arrange a plurality of transport units along the transport track, in which the movements can be controlled individually and separately from one another by energizing the respective drive coils cooperating with a transport unit, in general by applying a voltage.

A long stator linear motor is characterized, in particular, by a better and more flexible utilization across the entire operating range of the movement (position, velocity, acceleration), individual closed-loop/open-loop control of the transport units along the transport track, improved energy utilization, reduced maintenance costs due to the lower number of wear components, easy replacement of the transport units, efficient monitoring and fault detection, and an optimized product flow along the transport track. Examples of such long stator linear motors can be derived from WO 2013/143783 A1, U.S. Pat. No. 6,876,107 B2, US 2013/0074724 A1 or WO 2004/103792 A1.

Frequently, the long stator or a transport track is also composed in the form of individual track sections, which in turn are made of joined transport segments. This modularity allows a long stator linear motor to have a simpler design, in particular when defined track sections and transport segments are used. The design configuration of the long stator linear motor, which is to say, for example, the design of the drive coils, the conveyor track, the transport units, the guides of the transport unit, and so forth, can differ, of course, however the fundamental functional principle of a long stator linear motor always remains the same.

In general, such transport devices in the form of a long stator linear motor are usually arranged in one plane, so that the transport units are moved along a planar transport track. The transport track can be composed of transport segments in the form of curve segments, straight segments or switches; the movement, however, always takes place in the same plane. For certain applications, however, it may be necessary to move transport units from one plane into another plane, for example to transport components from a lower to a higher plane.

WO 2014/047104 A1, for example, proposes a transport device in the form of a long stator linear motor which can comprise 180° curved segments or angled transport segments to overcome vertical differences in height. A transport unit is essentially moved from a first horizontal plane into a higher or lower second horizontal plane, wherein the two planes are arranged parallel to one another. It is not possible, however, to transfer the transport unit into a vertical plane, for example.

WO 2015/042409 A1 likewise discloses a transport device in the form of a long stator linear motor (LLM), which makes it possible to move a transport unit, for example, from a horizontal plane into a vertical plane, changing the orientation of the transport unit from horizontal to vertical. For this purpose, various vertical and horizontal transport segments are provided. However, it is disadvantageous that a large number of different transport segments is required to change from the horizontal plane to the vertical plane, and that the flexibility with respect to the number and position of the movement planes is limited. Moreover, the design of the transport segments required for changing the movement plane is very complex.

EP 3 031 756 B1 discloses a transport system in the form of a long stator linear motor comprising stationary transport tracks, on which transport units can be moved in the known manner according to the motor principle. Furthermore, a conveying device, on which a connecting track section can be moved, is arranged at the ends of the stationary transport tracks in the transverse direction. The connecting track section can be moved on the conveying device so as to be brought into alignment with the stationary transport tracks. In this way, a transport unit can be moved from a stationary transport track onto the connecting track section, moved on the conveying device to another stationary transport track by way of the connecting track section, and continue to be moved along this other stationary transport track. Additionally, the conveying device can be moved vertically, whereby multiple stationary transport tracks arranged vertically on top of one another can be achieved. In addition to the very complex design, however, it is a disadvantage that no continuous movement of a transport unit between the stationary transport tracks is possible, and that only a movement in superimposed parallel planes is possible.

EP 1 123 884 A1 discloses a device for diverting containers from a movement track. The device comprises a movement track having multiple transport segments in the form of a long stator linear motor, along which rigid pushers can be moved in the longitudinal direction. The diversion is carried out in a direction transversely to the direction of movement by moving the pushers along a diversion section having a certain contour. Wheels including entrainment elements are provided at the end and at the beginning of the LLM movement track, and a return section is provided beneath the movement track. The pushers can be transported on the return section, or from there back to the movement track, by way of the wheels. Since the wheels directly adjoin the movement track, it is not possible to move the pushers smoothly, which would be disadvantageous, in particular, for the transport of sensitive objects.

SUMMARY OF THE EMBODIMENTS

Embodiments provide a simple and flexibly usable transport unit in the form of a long stator linear motor, which enables movement of a transport unit of the transport device in several different planes without jerk.

According to embodiments, adjoining a starting point or a ending point of a transport track in a longitudinal direction, a transition includes a continuous-flow conveyor having a longitudinal axis for transporting the transport unit in a direction of movement extending along the longitudinal axis. The continuous-flow conveyor is provided to move the transport unit in the direction of movement at least sectionally in a conveying plane deviating from the movement plane of the transport track. A steady transition between the movement plane of the transport track and the conveying plane of the continuous-flow conveyor is provided for moving the transport unit in the transition between the transport track and the transition segment without jerk. This allows the transport unit to be moved in different planes, without requiring a complex long stator linear motor transport segment comprising drive coils. The plane in which the transport unit is moved can thus be changed easily and cost-effectively. Due to the steady transition from the movement plane to the transport plane, moreover a movement of the transport unit without jerk can be made possible.

In the direction of the longitudinal axis of the continuous-flow conveyor, the conveying plane preferably extends parallel to the movement plane at least sectionally. In this way, the transport unit can be moved sectionally, for example on the continuous-flow conveyor, on a parallel plane that is located higher or lower relative to the movement plane.

If the conveying plane is rotated in the direction of movement at least sectionally by a certain rotational angle about the longitudinal axis of the continuous-flow conveyor, the change in plane of the transport unit can essentially take place helically about the longitudinal axis of the continuous-flow conveyor.

The longitudinal axis of the continuous-flow conveyor preferably includes at least one straight section and/or a curve section, wherein the curve section is preferably at least sectionally curved about an axis of curvature that is normal to the longitudinal axis. The continuous-flow conveyor, and thus the course of movement of the transport unit, can thus have a simple design, for example over the entire length of the continuous-flow conveyor, or only sectionally, in the form of an inclined plane or a circular arc.

For the movement of the transport unit along the continuous-flow conveyor preferably without jerk, it is advantageous when the longitudinal axis of the continuous-flow conveyor has a continuous course of curvature.

In the direction of movement, adjoining the transition segment, preferably at least one further transition segment comprising a continuous-flow conveyor is provided. This allows the flexibility in the design of a transport track to be increased and, for example, standardized transition segments can be combined.

If, adjoining the transition segment in the direction of movement, the starting or ending point of the transport track, or a starting or ending point of a further transport track, is provided, the transport track can either be closed by way of the transition segment, or the transition segment can be utilized to enable the transport unit to transition from the transport track onto a further transport track.

Advantageously, the continuous-flow conveyor comprises at least one holding device for holding the transport unit on the continuous-flow conveyor in a force-fit or form-locked manner, wherein the holding device preferably has ferromagnetic properties and cooperates with drive magnets of the transport unit so as to hold the transport unit in a force-fit manner, or the holding device comprises at least one receiving unit, which cooperates with at least one corresponding receiving element arranged on the transport unit so as to hold the transport unit on the continuous-flow conveyor in a form-locked manner. In this way, it can be ensured that the transport unit is held securely on the continuous-flow conveyor during the movement along the continuous-flow conveyor.

Advantageously, drive coils that are arranged at a distance from one another in the longitudinal direction, each having a coil axis, are arranged on the transport segments, wherein the coil axes of all drive coils of all transport segments of the transport track are located in a shared two-dimensional coil plane, wherein the coil plane corresponds to the movement plane of the transport track or is arranged parallel thereto. This makes a relatively simple design possible even with curved transport segments, and a uniform magnetic field can be generated both in the transverse direction and in the longitudinal direction of the transport segment.

BRIEF DESCRIPTION OF THE DRAWINGS

The present invention will be described in more detail hereafter with reference to FIGS. 1 to 5, which show advantageous embodiments of the invention by way of example and in a schematic and non-limiting manner. In the drawings.

DETAILED DESCRIPTION OF THE EMBODIMENTS

Figures 1A, 1B:
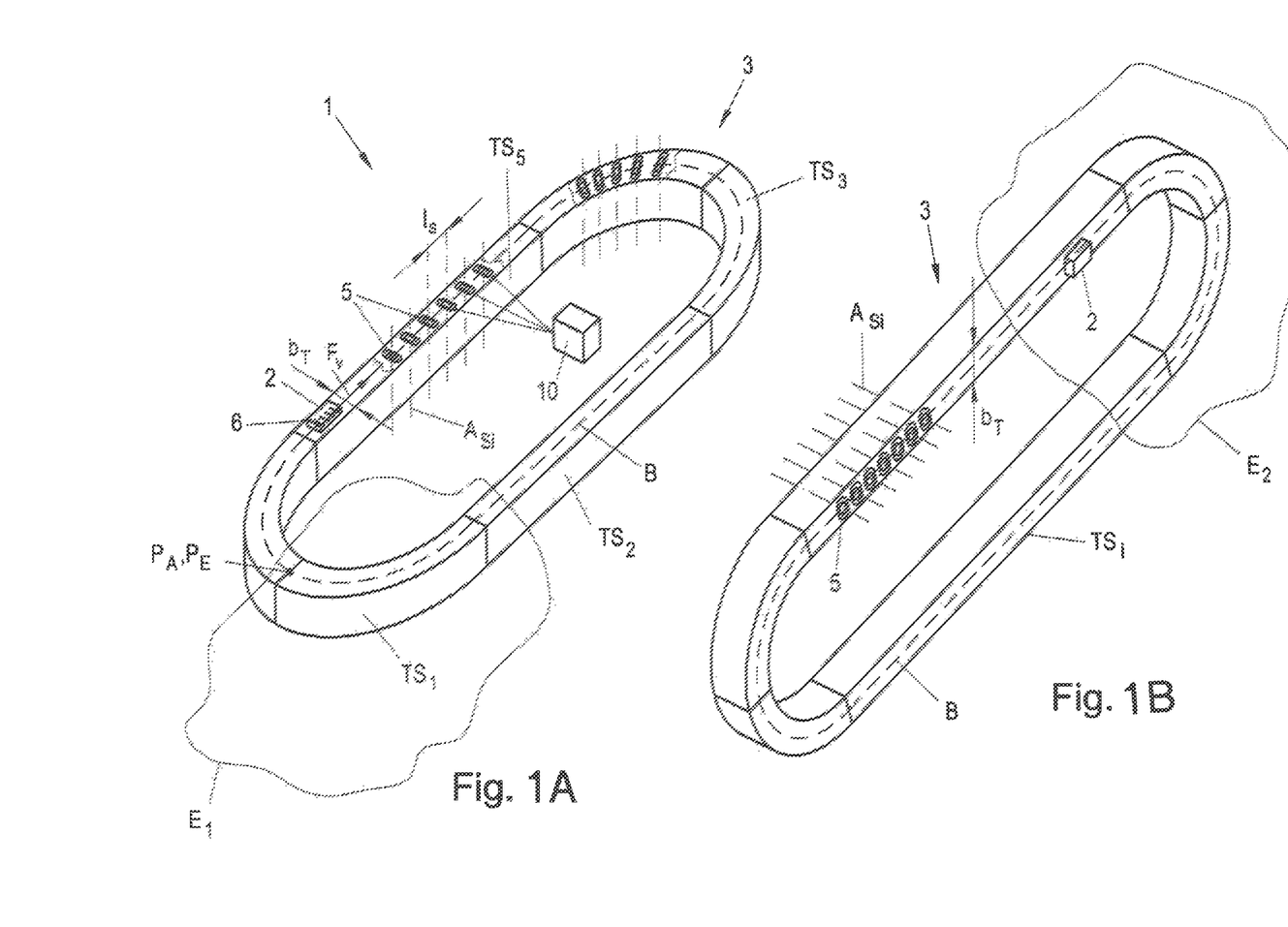
FIGS. 1A and 1B show transport devices in the form of a long stator linear motor.

FIGS. 1A and 1B show the basic design of a transport device 1 in the form a long stator linear motor. The transport device 1 comprises one or more transport units 2 and a transport track 3 along which the transport units 2 can be moved. The transport track is preferably composed of a number of transport segments $TS_i$ (i is an index here, denoting all present transport segments $TS_1$, $TS_2$, $TS_3$, . . . ), which are arranged consecutively in the direction of movement of the transport unit 2 and form the stator of the long stator linear motor, and has a starting point $P_A$ and an ending point $P_E$. In the shown example, the transport track 3 forms a closed loop, whereby the starting point $P_A$ and the ending point $P_E$ coincide. In the case of an open transport track 3, the starting point $P_A$ and the ending point $P_E$ do not coincide in one point, but are disposed at a distance from each other. The transport segments $TS_i$ form different track sections, such as a straight section, curves having different angles and radii, switches and the like, and can be assembled in a very flexible manner so as to form the transport track 3 of the transport device 1, along which the transport units 2 can be moved. This modular design enables a very flexible configuration of the transport unit 1. The transport segments $TS_i$ are, of course, arranged on a stationary supporting structure (not shown in FIGS. 1A and 1B).

The transport device 1 is implemented in the form of a long stator linear motor, in which each of the transport segments $TS_i$ forms a portion of a long stator of the long stator linear motor in the known manner. A plurality of stationary electric drive coils 5 forming the stator are thus arranged along the transport segments $TS_i$ (for the sake of clarity, FIG. 1A indicates these only for transport segments $TS_4$ and $TS_5$), which can cooperate with drive magnets 6 on the transport units 2 (for the sake of clarity, FIG. 1A indicates these only for one transport unit) so as to generate a propulsive force $F_V$ in the known manner for moving the transport unit 2 along a movement path B.

The movement path B is the course along which the transport unit 2 is moved on the transport track. The movement path B is predefined by the layout of the transport unit 2 and of the transport segments $TS_i$, for example by the size of an air gap between the drive magnets 6 of the transport unit 2 and the drive coils 5 of the transport track 3. The movement path B, however, is not an unambiguous, fixedly defined course, but essentially every point of the transport unit 2 has a dedicated movement path B along which this point runs as the transport unit 2 moves along the transport track 3. All of these individual movement paths B, however, extend parallel to one another, so it does not matter which movement path B is referred to. As a result, one movement path B will always be referred to hereafter.

The drive magnets 6 are generally implemented in the form of permanent magnets, and the drive coils 5 are usually activated by way of a control unit 10, which can be implemented in the form of a suitable controller. Guides 11, which are generally not shown, are provided on the transport segments $TS_i$ for guiding the transport units 2 along the movement path B of the transport track 3. The guides 11 ensure not only that a substantially constant distance (air gap) is maintained between the drive magnets 6 of the transport units 2 and the drive coils 5 of the transport segments $TS_i$, but also that the transport units 2 are held securely on the transport track 3. It may be task of the guide 11, for example, to absorb lateral forces in the transverse direction, which is to say transversely to the direction of movement of the transport units, to absorb centrifugal forces in curves, or to absorb weight forces due to gravity, to prevent the transport units 2 from falling off the transport track 3. However, it is also possible that only a lateral guide 11 is provided in the transverse direction, and that the transport unit 2 adheres to the transport segments $TS_i$ of the transport track 3 by way of a magnetic retaining force, which is generated by the drive magnets 6 of the transport unit 2 cooperating with the drive coils 5 of the transport segments $TS_i$. The guides 11 can be suitable rails, for example, on which rollers arranged on the transport unit 2 roll. The specific design of the guide, however, is not relevant for the invention; it is only important that it is ensured that the transport unit 2 is held securely on the transport track 3.

The transport device 1 is designed so that the transport unit 2 can be moved in a plane, for example in the horizontal movement plane $E_1$ shown in FIG. 1A. For this purpose, the transport track 3 of the transport device 1 includes at least one curved transport segment $TS_i$, for example the transport segment $TS_3$ in FIG. 1A, having a predefined movement path B that forms the movement plane $E_1$. The transport unit 2 can be moved on the entire transport track 3 in precisely this plane $E_1$ along the movement path B predefined by the individual transport segments $TS_i$.

However, the transport track 3 may also be vertically arranged, as is shown in FIG. 1B. The transport unit 2 can then be moved along the movement path B in the, here vertical, movement plane $E_2$ along the entire transport track 3. Essentially, the transport track 3, however, can also be situated arbitrarily in the space, the transport unit 2 always being movable in a movement plane $E_i$ formed by the movement path B of the at least one curved transport segment $TS_i$.

Figures 1C, 1D, 1E:
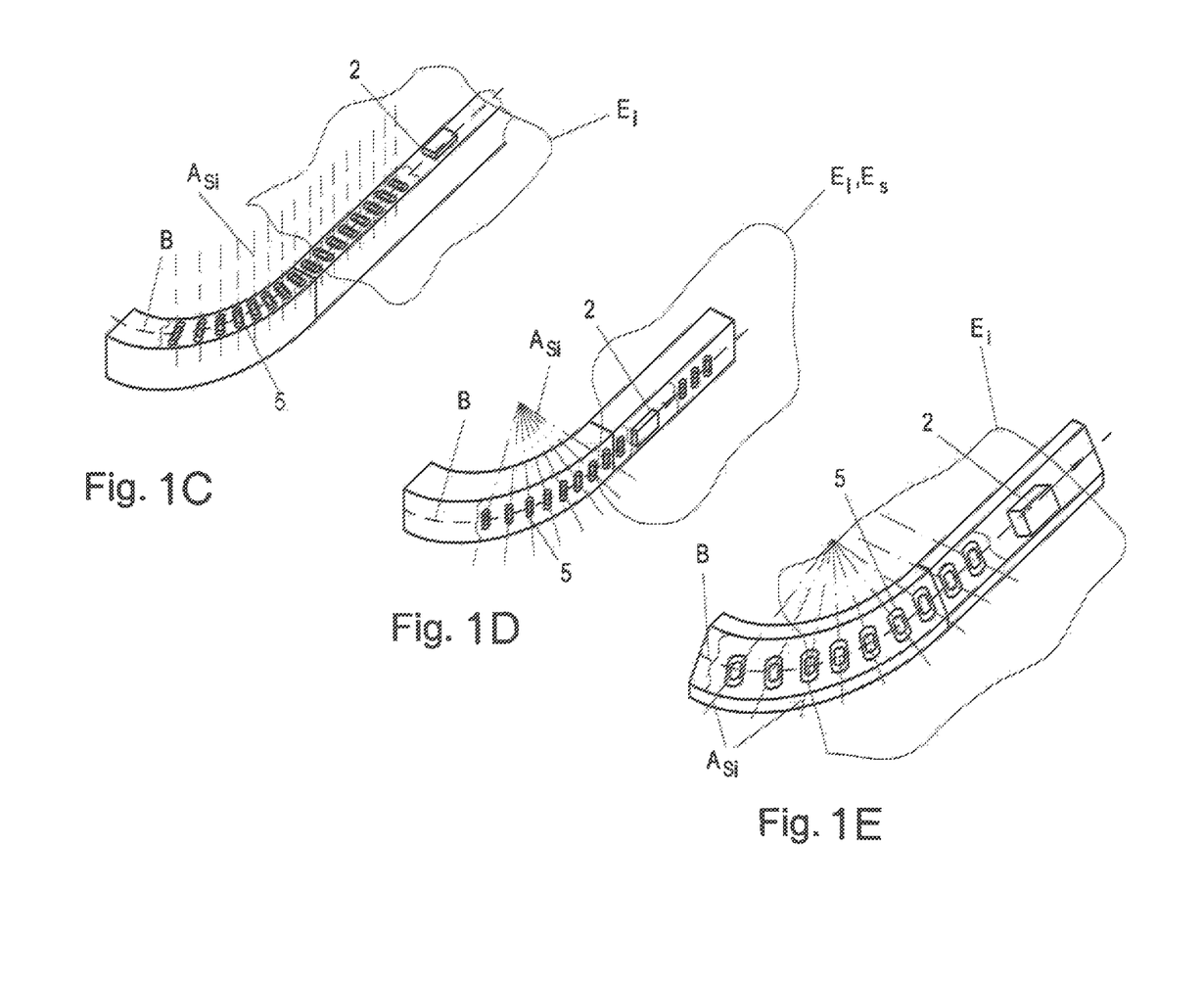
FIGS. 1C to 1E show three transport tracks having different arrangements of drive coils.

The drive coils 5, in general, have a cross-section similar to the shape of an elongated hole (or ellipse-like). The drive coils 5 each have a coil axis $A_{Si}$ and are arranged at a certain coil distance $l_S$ apart from one another in the longitudinal direction on the transport segments $TS_i$. The drive coils 5 can be arranged as is shown in FIGS. 1A to 1C, wherein all drive coils 5 of all transport segments $TS_i$ of the entire transport track 3 essentially have parallel coil axes $A_{Si}$. The coil axis $A_{Si}$ shall be understood to mean an axis through the center of the cross-section and normal thereto. If the cross-section has the shape of an ellipse or in the case of an ellipse-like cross-section, the center will be located at the point of intersection between the major axis and the minor axis of the ellipse, and if the cross-section has the shape of an elongated hole, the center will be located on a straight line connecting the two centers of the circles of the elongated hole, centrally between the two centers.

However, the drive coils 5 can also be arranged rotated by ninety degrees on the transport segment $TS_i$, as is shown in FIG. 1D. In the shown case, the transport units 2 would then not be moved on the upper side of the transport track 3 (as shown in FIG. 1C), but on the outer side (or the inner side) of the transport track 3. On a curved transport segment $TS_i$, the transport unit 2 would thus be moved along the curved lateral surface, for example. In this design, the coil axes $A_{Si}$ are located in a shared coil plane $E_S$, which substantially corresponds to the movement plane $E_i$ of the transport unit 2 or is arranged parallel thereto.

However, the drive coils 5 could also be arranged at a different angle on the transport segment $TS_i$, for example at an angle of 45 degrees, as is shown in FIG. 1E. Regardless of how the drive coils 5 are arranged, the transport unit 2 will always be movable in a movement plane $E_i$ along the entire transport track 3, which is defined by the movement path B of at least one curved transport segment $TS_i$. The concept of the invention thus covers arbitrary arrangements of the drive coils 5, as is shown based on FIGS. 1C to 1D by way of example.

Figure 2:
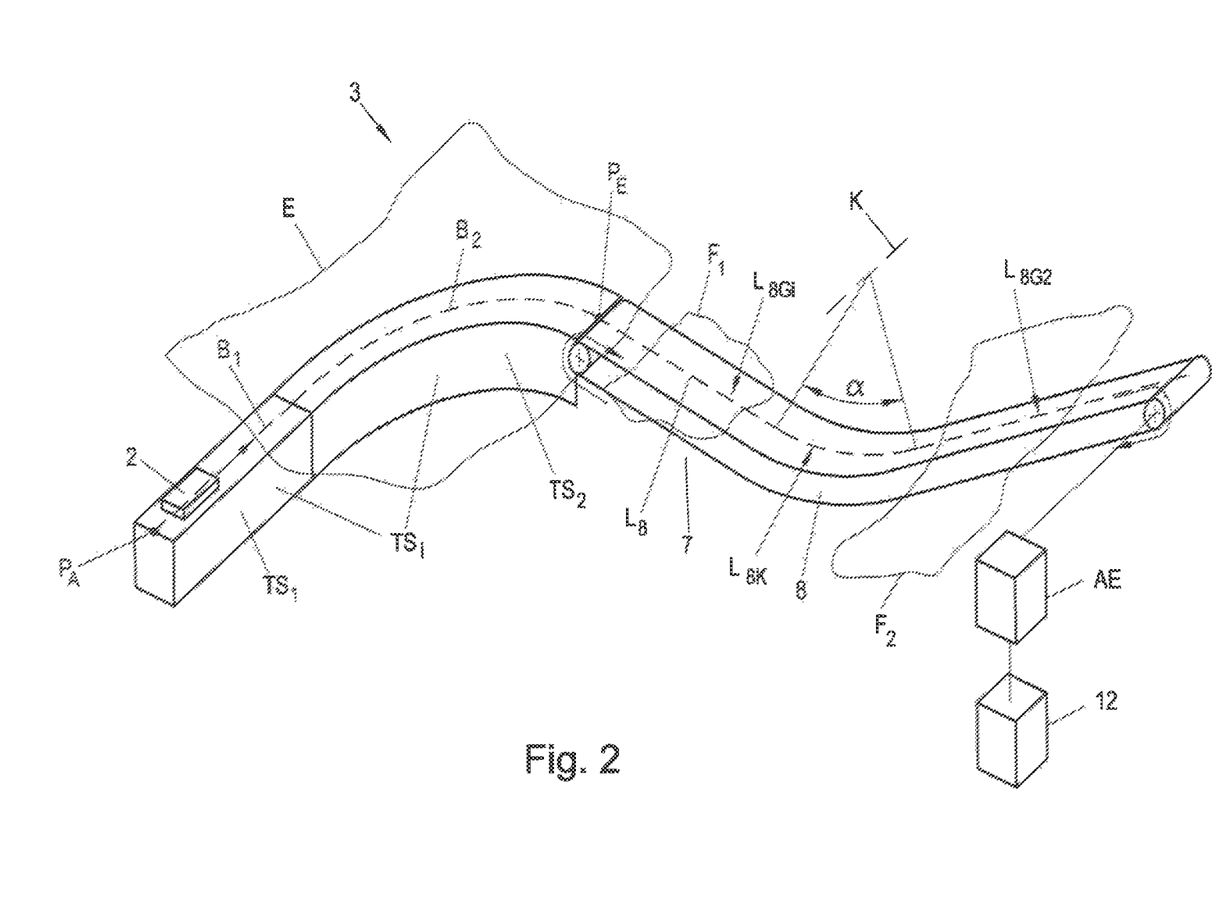
FIG. 2 shows a transport device according to the invention comprising a transition segment.

However, so as to be able to move the transport unit 2 not only in the movement plane $E_i$ of the transport track 3, but in different planes, according to the invention a transition segment 7 including a continuous-flow conveyor 8 having a longitudinal axis $L_8$ is provided, adjoining the starting point $P_A$ or the ending point $P_E$ of the transport track in the longitudinal direction, for transporting the transport unit 2 in a direction of movement extending along the longitudinal axis $L_8$, wherein the continuous-flow conveyor 8 is provided to move the transport unit 2 in the direction of movement at least sectionally in a conveying plane F deviating from the movement plane E of the transport track 3, as will be described in detail hereinafter based on FIG. 2.

FIG. 2 shows a transport track 3 comprising a straight transport segment $TS_1$ on which the starting point $P_A$ of the transport track 3 is located, and a curved transport segment $TS_2$, adjoining in the longitudinal direction, on which the ending point $P_E$ of the transport track 3 is located. The curved transport segment $TS_2$ has a movement path $B_2$, which forms a movement plane E in which the transport unit 2 can be moved along the entire transport track. In the shown example, the movement plane E is thus essentially arranged horizontally, but a vertical arrangement of the transport track 3 or any arbitrary arrangement in the space would also be conceivable, of course. Likewise, an alternative orientation of the drive coils 5 on the transport segments $TS_i$ of the transport track 3 according to the illustrations in FIGS. 1D and 1E would be conceivable. A transition segment 7 is provided, adjoining the ending point $P_E$ of the transport track 3 in the longitudinal direction, which comprises a continuous-flow conveyor 8, by way of which the transport unit 2 can be moved in the longitudinal direction $L_8$ along the continuous-flow conveyor 8.

The specific configuration of the continuous-flow conveyor 8 is not relevant. It may, as is indicated in FIG. 2, be designed in the form of a conveyor belt or as a chain conveyor, roller conveyor and the like. The continuous-flow conveyor 8 is driven by way of a suitable drive unit AE, and the control is carried out by way of a suitable control unit 12. The control, however, could also be integrated in the control unit 10 of the long stator linear motor, for example. It is also possible, for example, for multiple transport units 2 to be conveyed simultaneously on the continuous-flow conveyor 8; however, in contrast to the transport track 3, the transport units 2 on the continuous-flow conveyor 8 cannot be controlled independently of one another, but are moved at the conveying speed predefined by the drive unit AE and the control unit 12. The conveying speed of the continuous-flow conveyor 8 is preferably constant, but an acceleration or a deceleration of the continuous-flow conveyor 8 would also be conceivable.

The transport unit 2 is moved in the conventional manner on the curved transport segment $TS_2$, which is to say by a cooperation between drive magnets 6 of the transport unit 2 and drive coils 5 of the transport segment $TS_2$, to the ending point $P_E$ of the transport track 3. At the ending point $P_E$, the transport unit is transferred to the transition segment 7 and thereafter is conveyed in a conveying plane F on the continuous-flow conveyor 8. The revolving movement of the continuous-flow conveyor 8 designed as a conveyor belt is indicated by the two arrows in FIG. 2. The longitudinal axis $L_8$ of the continuous-flow conveyor 8 corresponds to the direction of movement of the transport unit 2. In the specific exemplary embodiment according to FIG. 2, the longitudinal axis $L_8$ of the continuous-flow conveyor 8 includes a first straight section $L_{8G1}$, an adjoining curve section $L_{8K}$, and a second straight section $L_{8G2}$ adjoining thereon.

The first straight section $L_{8G1}$ extends parallel to the movement plane E of the transport track 3, and the conveying plane $F_1$ in which the transport unit 2 is moved on the continuous-flow conveyor in the region of the first straight section $L_{8G1}$ thus essentially corresponds to the movement plane E of the transport track 3. The curve section $L_{8K}$ causes a change from the conveying plane $F_1$ toward a conveying plane $F_2$ in the region of the second straight section $L_{8G2}$ deviating from the conveying plane $F_1$, and thus also deviating from the movement plane E. As a result, the transport unit 2 is moved in a different plane in the region of the second straight section $L_{8G2}$ than on the transport track 3. The transport unit 2 can be moved along the second straight section $L_{8G2}$ in this conveying plane $F_2$ to the end of the continuous-flow conveyor 8, as is shown in FIG. 2. The curve section $L_{8K}$ has a curvature κ about a curve axis K disposed normal to the longitudinal axis $L_8$, but arbitrary other courses of curvature and a different position of the curve axis K in the space would also be conceivable. The course of the longitudinal axis $L_8$ of the continuous-flow conveyor 8 can thus have a very flexible design, for example the longitudinal axis $L_8$ could also comprise only one straight section $L_{8G}$, only one curve section $L_{8K}$, or a combination of multiple straight sections $L_{8Gi}$ and multiple curve sections $L_{8Ki}$.

So as to ensure a movement of the transport unit 2 without jerk in the region between the transport segment $TS_i$ of the transport track 3, on which the ending point $P_E$ is located, and the continuous-flow conveyor 8, a steady transition is preferably provided between the movement plane E and the conveying plane F. Likewise, the longitudinal axis $L_8$ of the continuous-flow conveyor 8 preferably has a continuous course of curvature in the direction of movement so as to enable a movement of the transport unit 2 along the continuous-flow conveyor 8 without jerk. In the specific exemplary embodiment in FIG. 2, this means that no curvature jump exists between the straight sections $L_{8Gi}$ and the curve section $L_{8K}$. For this purpose, a respective transition section can be arranged between the straight sections $L_{8Gi}$ and the curve section $L_{8K}$, in which the curvatures κ of the straight sections (curvature κ=infinite) continuously approach the curvature is of the curve of the curve section $L_{8K}$. The design of the curve section $L_{8K}$ can be arbitrary, for example in the form of a circular arc, a spline and the like. Of course it would also be possible for the longitudinal axis $L_8$ to include multiple curve sections $L_{8Ki}$ which adjoin one another or are connected by straight sections $L_{8Gi}$. The transition segment 7, and the continuous-flow conveyor 8 in particular, can thus have a very flexible design and be adapted to the desired requirement.

Figure 3:
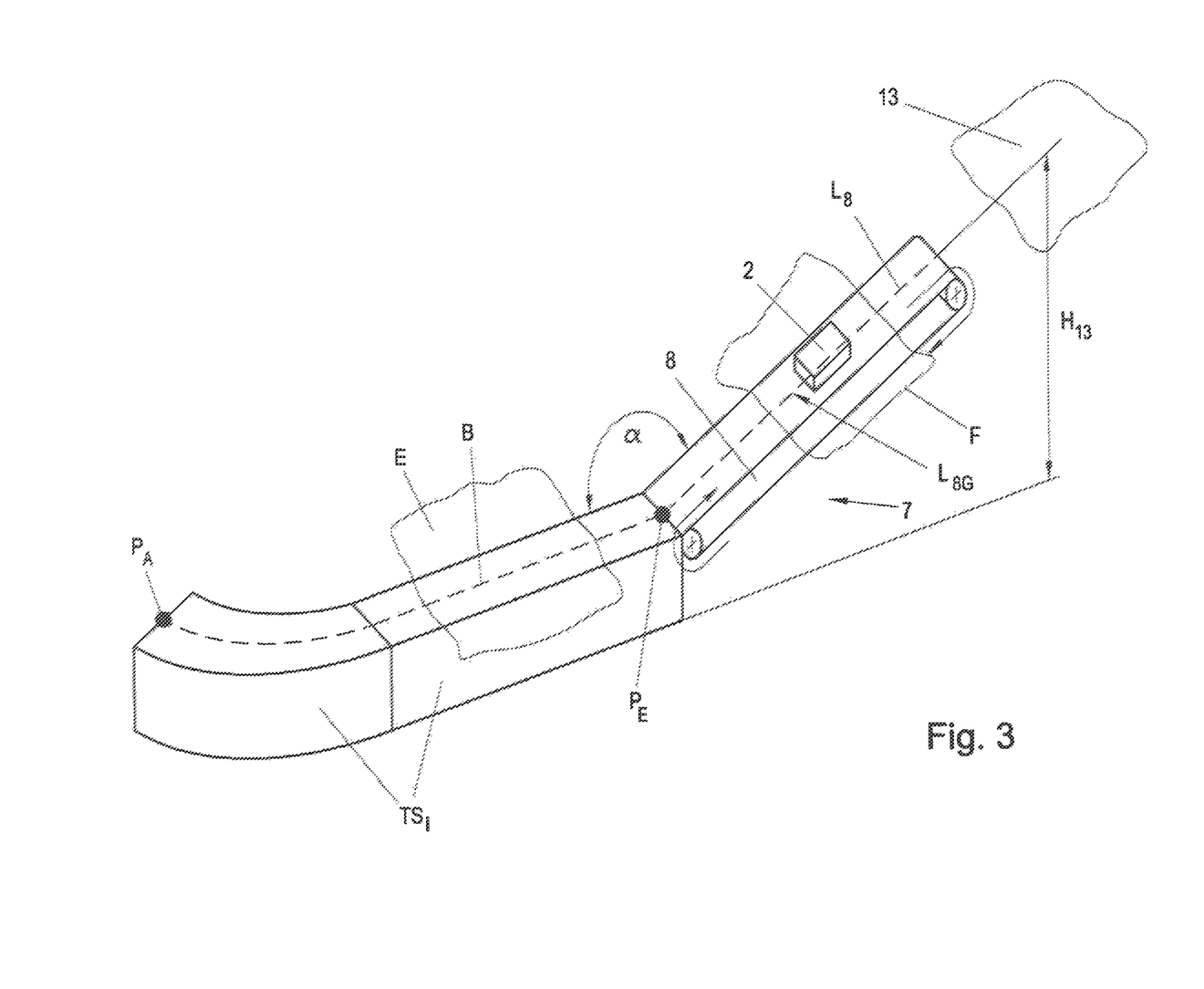
FIG. 3 shows a transport device according to the invention comprising a transition segment in an alternative embodiment.

For example, the longitudinal axis $L_8$ of the continuous-flow conveyor 8 could also include only one straight section $L_{8G}$, which is arranged, for example, at a certain angle α with respect to the movement plane E of the transport track 3, as is shown in FIG. 3 based on a transition segment 7 adjoining the ending point $P_E$ of a straight transport segment $TS_i$. The continuous-flow conveyor 8 is thus essentially designed in the form of an inclined plane, and the transport unit 2 could then be conveyed, for example, by way of the continuous-flow conveyor 8 in the conveying plane F from the movement plane E onto a higher plane 13 located parallel thereto and spaced apart from the movement plane E at a distance $H_{13}$. Depending on the length of the transition segment 7 and of the continuous-flow conveyor 8 arranged thereon, and depending on the size of the angle α, it is possible to vary the distance $H_{13}$, and the plane 13 could also be located beneath the movement plane E, for example, if the angle α in the illustrated example were greater than 180°. It would be possible, of course, for a further transport track 3 or a further transition segment 7 to be arranged in the plane 13; however, an open end could also be provided, for example for removing the transport unit 2 from the transport device 1.

According to a further preferred embodiment of the invention, the conveying plane F of the continuous-flow conveyor 8 is rotated in the direction of movement at least sectionally by a certain rotational angle β about the longitudinal axis $L_8$ of the continuous-flow conveyor 8, as will be described in more detail hereafter based on FIG. 4. The continuous-flow conveyor 8 of the transition segment 7 in FIG. 4 adjoins a straight transport segment $TS_i$ of the transport track 3 at the ending point $P_E$. The conveying plane F of the continuous-flow conveyor 8 is rotated in the direction of movement of the transport unit 2 in a linear fashion about the longitudinal axis $L_8$ over the length of the continuous-flow conveyor 8, so that the conveying plane F has a rotational angle β of ninety degrees at the end of the continuous-flow conveyor 8. Additionally, the longitudinal axis $L_8$ of the continuous-flow conveyor 8 is arranged at an angle α with respect to the movement plane E.

The transport unit 2 can thus be moved from the movement plane E of the transport track 3 by way of the conveying plane F into a plane 14 at the end of the continuous-flow conveyor 8 which is rotated by ninety degrees. Due to the angle α between the longitudinal axis $L_8$ and the plane E of the transport track 3, the transport unit 2 can additionally be moved vertically upwardly by a distance $H_{14}$. The distance $H_{14}$ depends on the size of the angle α and the length of the continuous-flow conveyor 8. If the angle α in the shown example is greater than 180 degrees, the transport unit 2 can also be moved downwardly relative to the plane E. The rotational angle β can, of course, by set arbitrarily and is not limited to the 90° shown.

The rotation of the conveying plane F, however, does not have to take place in a linear fashion over the length of the continuous-flow conveyor 8, and a non-linear progression of the rotational angle β over the length of the continuous-flow conveyor 8 would also be conceivable. In the case of a linear progression of the rotational angle β, the rotation of the transport unit 2 takes place continuously in the direction of movement over the length of the continuous-flow conveyor 8, and at a constant speed of the transport unit 2 the forces acting on the transport unit 2 thus remain essentially constant when traversing the transition segment 7. In the case of a non-linear progression of the rotational angle β, for example of 90 degrees, over the length of the continuous-flow conveyor 8, the change in the rotational angle β could be 45°, for example, over the first two thirds of the length of the transition segment 7, and could be the remaining 45° over the last one third of the length of the transition segment 7. Due to the small change in the rotational angle β over the first two thirds of the transition segment 7, it is achieved, for example, that no impermissibly high lateral forces act on the transport unit 2 at a high initial speed of the transport unit 2. The last third of the transition segment 7 having a larger change in the rotational angle β could be traversed at a reduced speed, for example, without the lateral forces increasing compared to the first two thirds of the transition segment 7, or without impermissibly high lateral forces acting on the transport unit 2. The lateral forces acting on the transport unit 2 due to the rotation of the transport unit 2 could thus be kept essentially constant over the length of the transition segment 7, for example, despite a change in speed. Of course, this shall only be understood by way of example, and other non-linear progressions of the rotational angle β over the length of the transition segment 7 would also be possible. In general, however, the conveying speed of the continuous-flow conveyor 8 will be constant, and the transport unit 2 is moved at the constant conveying speed of the continuous-flow conveyor 8 along the conveyor segment 7. In this case, it will be sufficient to provide a linear progression of rotational angle β over the length of the transition segment 7.

Depending on the field of use of the transport device 1, it could also be necessary, for example, to rotate the transport units 2 by a rotational angle β of less than or greater than 90°, for example so as to process, or manipulate in another manner, elements transported by the transport units 2 in variously configured work stations A. For example, it would be conceivable to arrange a continuous-flow conveyor 8 at a rotational angle β=180°.

Figure 4:
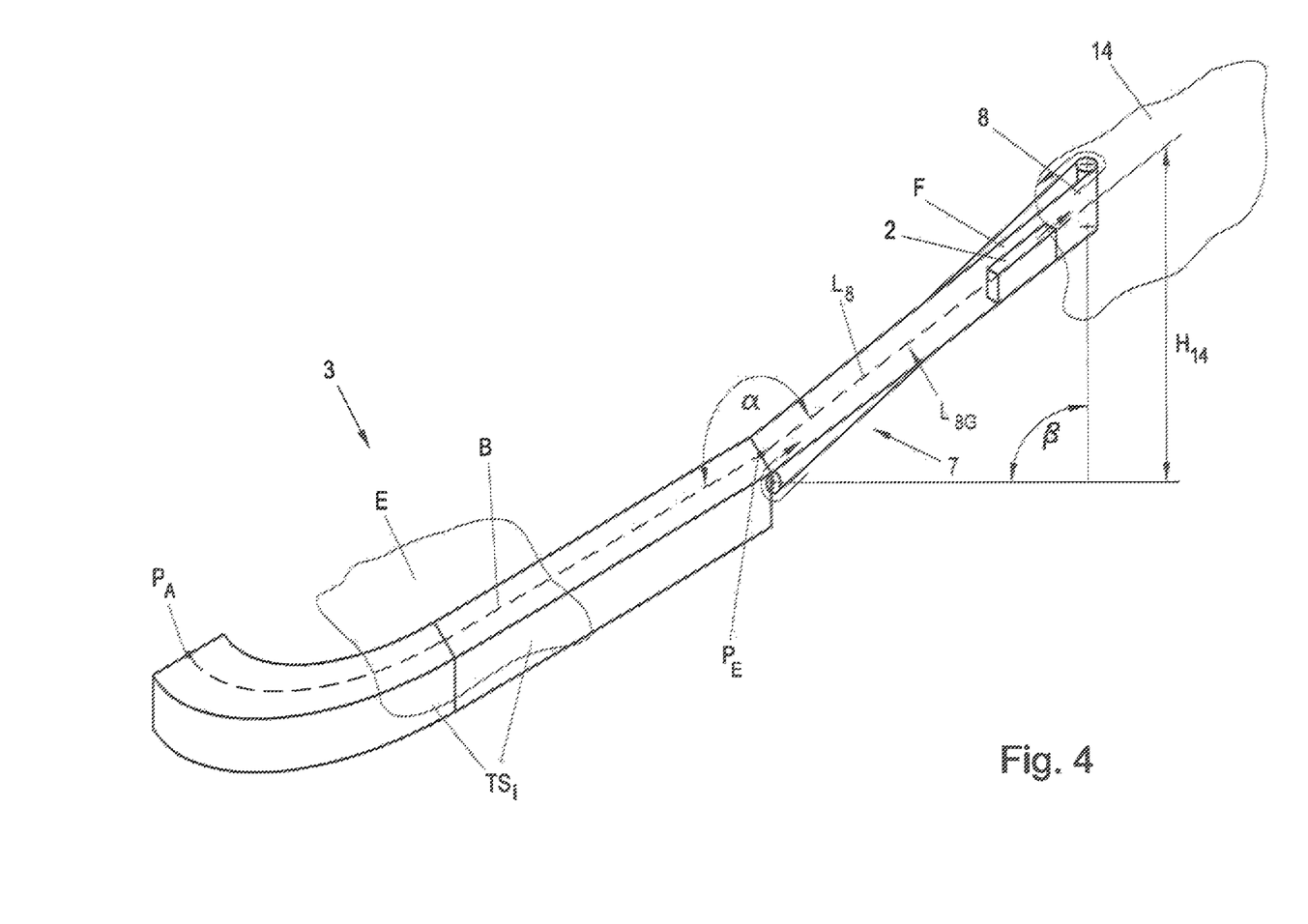
FIG. 4 shows a transport device according to the invention comprising a transition segment in a further alternative embodiment.

The described variant can also be combined, of course; for example, the longitudinal axis $L_8$ of the continuous-flow conveyor 8 shown in FIG. 4 rotated by the rotational angle β could include not only a straight section $L_{8G}$, but could also include one or more curve sections $L_{8Ki}$ and straight sections $L_{8Gi}$.

It is apparent that the design of the continuous-flow conveyor 8 of the transition segment 7 provides a multitude of options for configuring the transition segment 7.

Preferably, at least one holding device 15 is provided on the continuous-flow conveyor 8 for holding the transport unit 2 on the continuous-flow conveyor 8 in a force-fit or form-locked manner. In particular, when the conveying plane F, due to the angle α, has an uphill grade (or a downhill grade) or in the case of rotations of the conveying plane F due to the rotational angle β, a suitable holding device 15 can prevent the transport unit 2 from falling off the continuous-flow conveyor 8. According to a preferred embodiment, the holding device 15 has ferromagnetic properties and can thereby cooperate with the drive magnets 6 of the transport 2 for holding the transport unit 2 on the continuous-flow conveyor 8.

Figure 5:
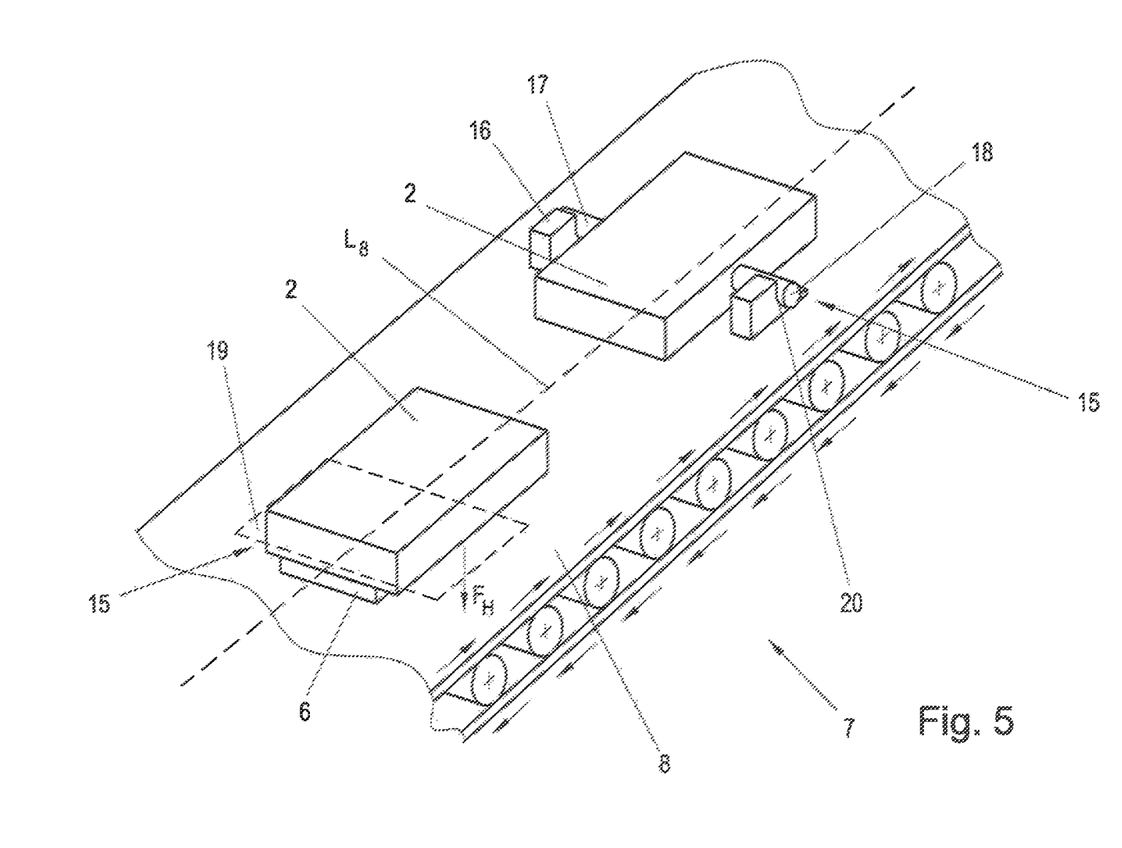
FIG. 5 shows a detail of a transition segment including a holding device.

If the continuous-flow conveyor 8 is designed as a conveyor belt, for example, the conveyor belt could be made of a suitable ferromagnetic material. The transport unit 2 would thereby adhere to the conveyor belt as a result of the magnetic interaction between the ferromagnetic material and the drive magnets 6. However, other embodiments would also be conceivable, for example a conveyor belt made of a suitable plastic material, in which ferromagnetic elements 19 are integrated, as is indicated in FIG. 5. The magnetic interaction between the drive magnets 6 of the transport unit 2 and the ferromagnetic element 19 creates a retaining force $F_H$, which holds the transport unit on the continuous-flow conveyor 8.

In an alternative embodiment, the holding device 15 of the continuous-flow conveyor 8 comprises at least one, and preferably multiple receiving units 16 for holding the transport unit 2 on the continuous-flow conveyor 8 in a form-locked manner, as is likewise shown in FIG. 5. The receiving unit 16 cooperates with a suitable receiving element 17, which is arranged on the transport unit 2. For example, the receiving units 16 could include an elongated cylindrical groove 20, and the receiving element 17 of the transport unit 2 includes a cylindrical pin 18 corresponding thereto. The receiving element 17 of the transport unit 2 would be received by the receiving unit 16 at the ending point $P_E$ of the transport track 3 in a form-locked manner and be transported to the end of the continuous-flow conveyor 8. This, of course, is only provided by way of example, and a person skilled in the art could also provide other suitable holding devices 15 on the continuous-flow conveyor 8.

At the end of the continuous-flow conveyor 8, the transport unit 2 could be transferred, for example, to a further transport track 3 of a transport device 1 in the form of a long stator linear motor, or the starting point $P_A$ of the same transport track 3 could adjoin the transition segment 7 so as to form a closed loop. However, it would also be possible for a further transition segment 7 to be arranged so as to adjoin the transition segment 7. For example, different standardized transition segments 7 could be defined in a modular manner. Depending on the requirement with regard to a transport device 1, certain transition elements 7 could be selected from the modular system and be arranged consecutively in the direction of movement.

Figure 6:
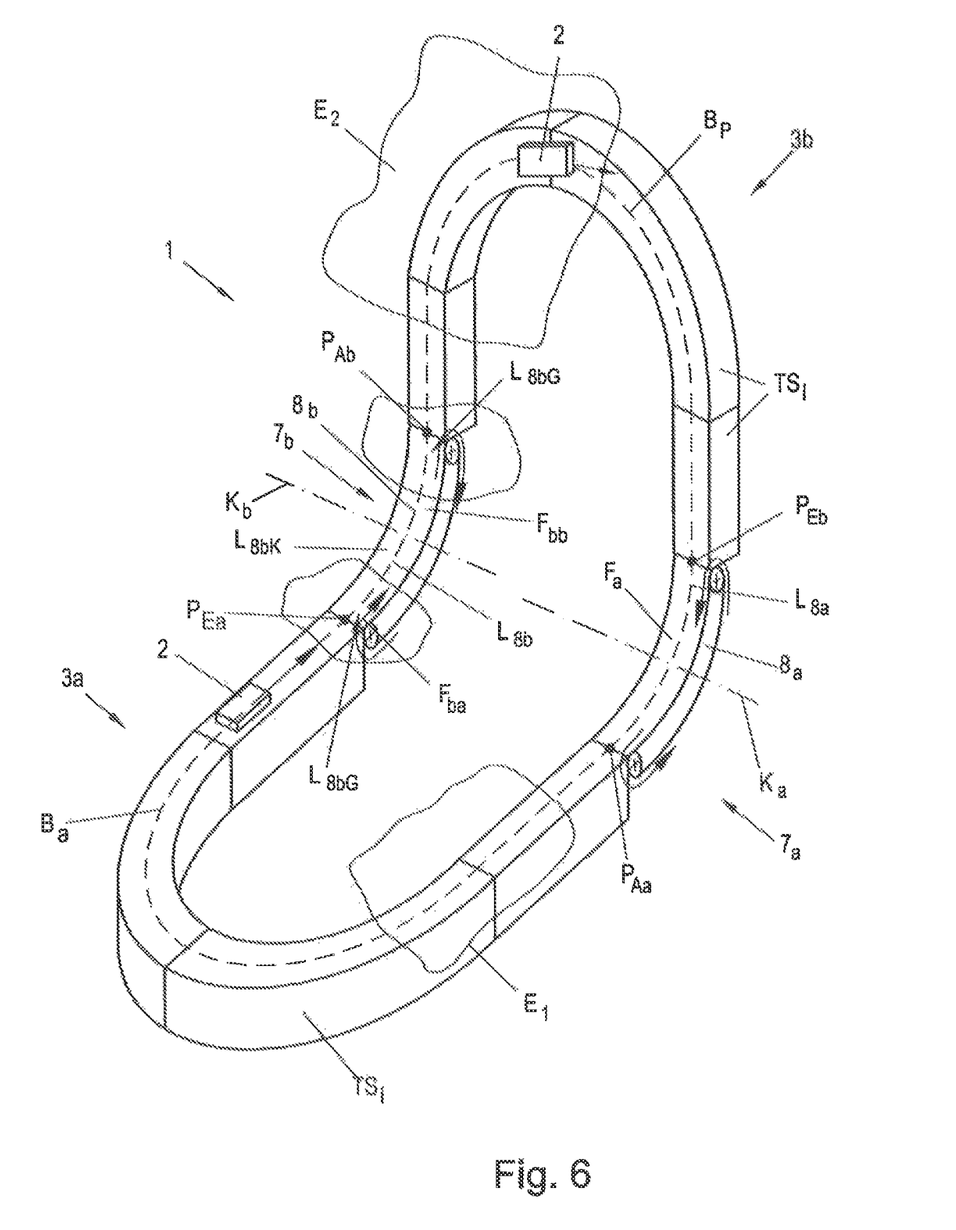
FIG. 6 shows a transport device according to the invention comprising two transport tracks and two transition segments.

FIG. 6, by way of example, shows an exemplary embodiment comprising two transport tracks $3_a$, $3_b$ in the form of long stator linear motors and two transition segments $7_a$, $7_b$ for connecting the two transport tracks $3_a$, $3_b$. The transport unit 2 can be moved in the conventional manner by the cooperation between drive magnets 6 of the transport unit 2 and drive coils of the transport segment $TS_i$ along a movement path B, in the movement plane $E_1$ of the first transport track $3_a$. At the ending point $P_{Ea}$ of the first transport track $3_a$, the transport unit 2 can be transferred to the transition segment $7_b$ and the continuous-flow conveyor $8_b$ arranged thereon. The continuous-flow conveyor $8_b$ has a curved design here, which is to say has a curved longitudinal axis $L_{8b}$. The transition between the transport segment $TS_i$, on which the ending point $P_{Ea}$ of the first transport track $3_a$ is located, and the continuous-flow conveyor $8_b$ is preferably designed to be steady, so that a movement of the transport unit 2 in the transition substantially without jerk can be ensured. Without jerk essentially means that no acceleration jumps occur in the movement of the transport unit 2.

The longitudinal axis $L_{8b}$ of the continuous-flow conveyor $8_b$ preferably has a continuous course of curvature so as to ensure a movement without jerk not only in the transition between the transport track $3_a$ and the continuous-flow conveyor $8_b$, but in particular also during the movement of the transport unit 2 on the continuous-flow conveyor $8_b$. For this purpose, the longitudinal axis $L_{8b}$ of the continuous-flow conveyor $8_b$ can include a curve section $L_{8K}$ having a suitable course of a curve, for example in the form of a spline or the like. In the specific example, to the longitudinal axis $L_{8b}$ of the continuous-flow conveyor $8_b$ includes a central curve section $L_{8bK}$ in the form of a circular arc having a curve axis $K_b$ disposed normal to the longitudinal axis $L_{8b}$. At the two ends, the longitudinal axis $L_{8b}$ includes straight sections $L_{8bG}$ so as to ensure a steady transition to the adjoining straight transport segments $TS_i$ of the two transport tracks $3_a$, $3_b$. So as to achieve a continuous course of curvature over the entire longitudinal axis $L_{8b}$, connecting sections are provided between the straight sections $L_{8bG}$ and the central curve section $L_{8bK}$ on which the curvatures κ of the straight sections $L_{8bG}$ (curvature κ=infinite) and the curvature κ of the curve section $L_{8bK}$ continuously approach one another.

The conveying plane $F_b$ in which the transport unit 2 on the continuous-flow conveyor $8_b$ is moved thus changes continuously in the direction of movement along the longitudinal axis $L_{8b}$. At the ending point $P_{Ea}$, the conveying plane $F_{ba}$ is parallel to the first movement plane $E_1$ of the first transport track $3_a$, and at the end of the continuous-flow conveyor $8_b$, the conveying plane $F_b$ is parallel to the second movement plane $E_2$ of the second transport track $3_b$. The second movement plane $E_2$ of the second transport track $3_b$ is disposed normal to the first movement plane $E_1$ of the first transport track $3_a$ here. The transition segments $7_a$, $7_b$ according to the invention thus allow the transport unit 2 to be moved on two separate transport tracks $3_a$, $3_b$ in two different movement planes $E_1$, $E_2$ and to be transferred between the two transport tracks $3_a$, $3_b$. In the shown example, the two transport tracks $3_a$, $3_b$ essentially have the same design, each comprising two straight transport segments $TS_i$ and two transport segments $TS_i$ curved by 90 degrees.

The two transition segments $7_a$, $7_b$ likewise have the same design, but have opposite conveying directions of the continuous-flow conveyors $8_a$, $8_b$, as is indicated by the arrows in FIG. 6. The transition segments $7_a$, $7_b$ are preferably designed so that both directions of movement along the longitudinal axis $L_8$ of the respective continuous-flow conveyor $8_a$, $8_b$ are possible. Consequently, it does not matter which end of the transition segment 7 adjoins the first transport track $3_a$ and which end adjoins the second transport track $3_b$.

The conveying direction of the continuous-flow conveyor 8 can be controlled in keeping with the direction of movement of the transport unit 2, for example by way of the control unit 12 (see FIG. 2). In the shown exemplary embodiment, the continuous-flow conveyor $8_a$, $8_b$ could also be controlled in a central control unit 10 of the entire transport device 1, for example, which is not shown. The central control unit 10 would jointly activate the two transport tracks $3_a$, $3_b$ and the two transition segments $7_a$, $7_b$.

Figure 7:
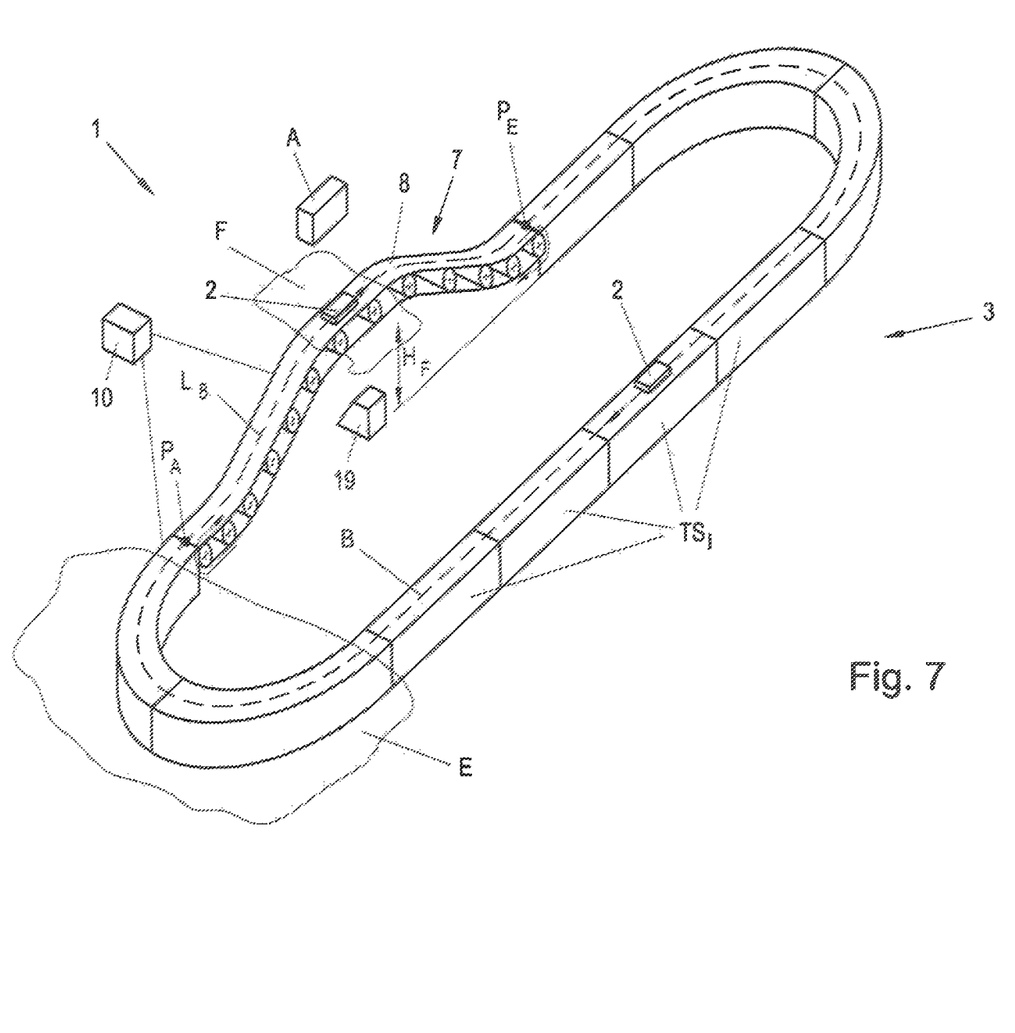
FIG. 7 shows a closed transport device according to the invention comprising a transition segment.

FIG. 7 shows a further alternative exemplary embodiment of a transport device 1 comprising a transport track 3 and a transition segment 7. The transport track 3 is composed of multiple straight and curved transport segments $TS_i$ and has a starting point $P_A$ and an ending point $P_E$. The starting point $P_A$ and the ending point $P_E$ are connected by the transition segment 7 so as to form a closed loop. The transport unit 2 can be moved on the transport track 3 in the movement plane E, which is predefined by the movement path B of at least one curved transport segment $TS_i$. The longitudinal axis $L_8$ of the continuous-flow conveyor 8 arranged on the transition segment 7 includes multiple straight sections $L_{8G}$ and multiple curved sections $L_{8K}$ and is essentially designed so that the transport unit 2 can be moved from the movement plane E of the transport track 3 into the conveying plane F arranged at a distance therefrom by a height $H_F$, for example for manipulating an object transported by the transport unit 2 in a work station A. The shown transition segment 7, however, could also be used, for example, to overcome one or more obstacles 19, which may be arranged in the movement plane E of the transport track 3.

Figure 8:
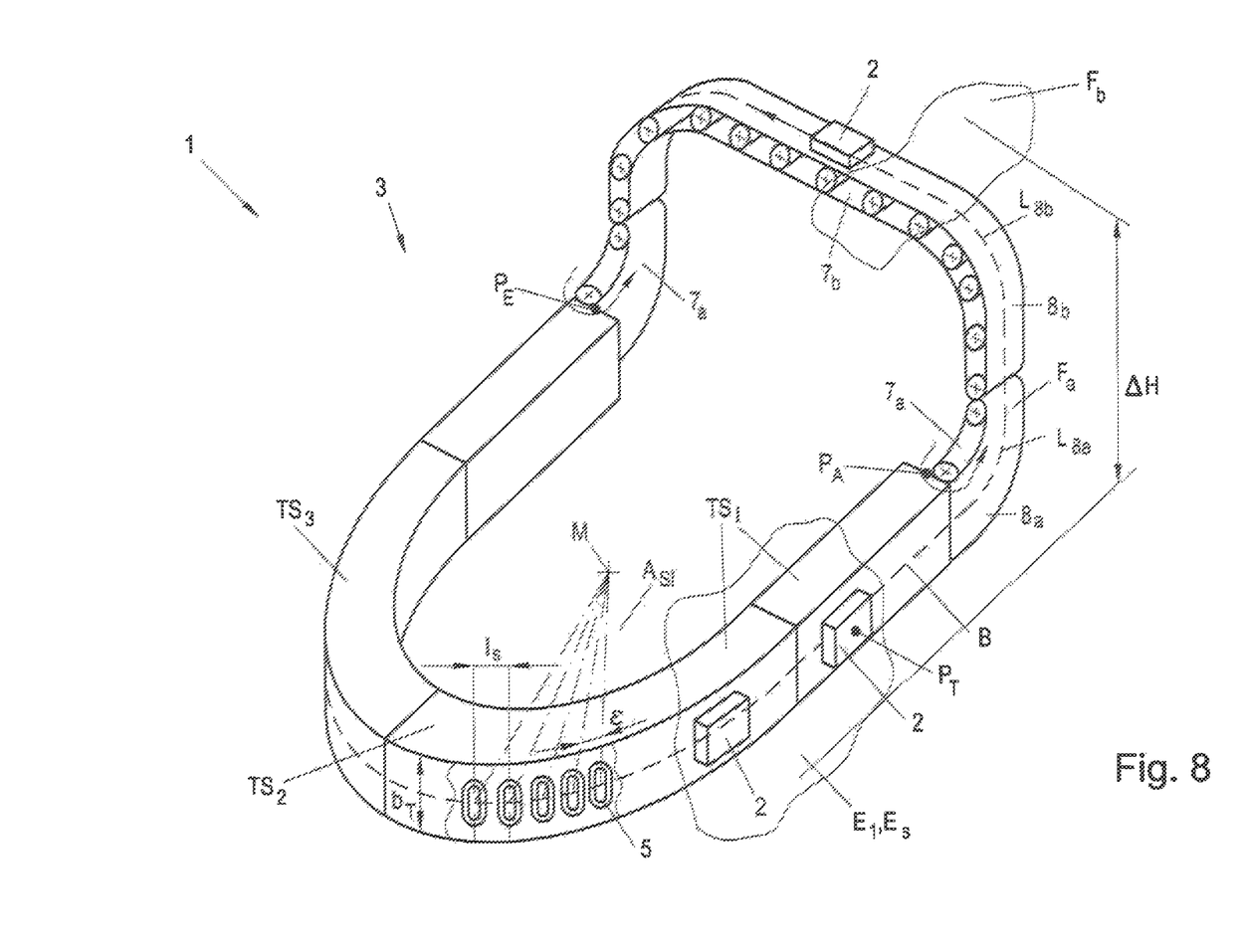
FIG. 8 shows a closed transport device according to the invention comprising one transport track and three transition segments.

FIG. 8 shows a transport track 3 in a further preferred embodiment. The arrangement of the drive coils 5 on the transport segments $TS_i$ corresponds to the embodiment described at the outset based on FIG. 1D, so that the transport units 2 can essentially be moved on the outside on the transport track 3. The coil axes $A_{Si}$ of the drive coils 5 of the curved transport segments $TS_i$ are arranged at a coil angle ε with respect to one another and preferably intersect in a shared point M. In the shown example, the point M is also the center of the radius of curvature of the curved transport segments $TS_2$, $TS_3$. The coil axes of all drive coils 5 of all transport segments $TS_i$ of the entire transport track 3 are located in a shared coil plane $E_S$. The coil plane $E_S$ essentially corresponds to the movement plane $E_1$, which is defined by the movement path B of the curved transport segments $TS_2$, $TS_3$ and in which the transport unit 2 can be moved along the entire transport track 3 or, in any case, is parallel thereto (this essentially depends on which point $P_T$ of the transport unit $TS_i$ is considered since each point $P_T$ follows a dedicated movement path B).

The coil angles ε between the individual drive coils 5 of a curved transport segment $TS_i$, however, do not all have to be equal, as in the example shown in FIG. 8. For example, a transport segment $TS_i$ could be configured to have a variable course of curvature over the length. The coil angle ε would then not be constant on the entire transport segment $TS_i$, but essentially depend on the curvature κ. For example, a so-called curve entrance segment could be provided, which at one end in the longitudinal direction has a predefined curvature is dissimilar from zero (κ≠0), and at the other end in the longitudinal direction has an infinite curvature κ (κ=∞), with a preferably continuous course of curvature between the two ends.

The transport track 3 has a starting point $P_A$ and an ending point $P_E$, which are each located on a straight transport segment $TS_i$ here. A respective transition segment $7_a$ in the form of an arc curved upwardly by 90 degrees adjoins the starting point $P_A$ and the ending point $P_E$. According to the invention, a continuous-flow conveyor $8_a$ having a longitudinal axis $L_{8a}$ is arranged on the transition segment $7_a$ and is designed in the form of a conveyor belt having a curved conveying plane $F_a$ here. The two transition segments $7_a$ are connected by way of a further transition segment $7_b$ so that the transport device 1 forms a closed loop, along which the transport unit 2 can be moved. The transition segment $7_b$, of course, likewise comprises a continuous-flow conveyor $8_b$ having a longitudinal axis $L_{8b}$. Using the shown arrangement, the transport unit 2 can be moved by way of the transition segments $7_a$, $7_b$ from the movement plane $E_1$ of the transport track 3 into a plane located higher by a difference in height ΔH, which corresponds to the conveying plane $F_b$ of the continuous-flow conveyor $8_b$ of the transition segment $7_b$ here. The continuous-flow conveyors $8_a$, $8_b$ preferably comprise a holding device 15, which is not shown, for holding the transport unit 2 on the respective continuous-flow conveyor $8_a$, $8_b$ in a force-fit or form-locked manner.

The configuration of the transport track 3 according to FIG. 1D and FIG. 8 has the advantage over the configuration according to FIGS. 1C, 1E, in particular in the curved transport segments $TS_i$, that a uniform coil distance $I_S$ in the longitudinal direction along the movement path B is achieved over the entire width $b_T$ of the transport segment $TS_i$. In this way, a very uniform magnetic field can be generated by the drive coils 5 over the entire width $b_T$ and the entire length of the curved transport segment $TS_i$. This is advantageous, in particular, when, for example, very precise control of the transport unit 2 is required, such as when a position or a speed is to be set with very high precision.

It is apparent that the transport device 1 according to the invention achieves high flexibility in terms of the spatial configuration, which is advantageous, in particular, when space constraints exist in the movement plane E.

The invention is, of course, not limited to the shown examples, and arbitrarily configured transport tracks 3 can be combined with arbitrarily designed transition segments 7 to be able to move the transport unit(s) 2 in several different planes.

Even though the invention was only described based on a one-sided transport track 3, the concept of the invention also covers a two-sided transport track 3. Drive magnets 6 are provided on both sides of the transport unit 2, seen in the direction of movement, which cooperate with drive coils 5 of transport segments $TS_i$ arranged on both sides of the transport unit 2. The transition segments 7 could then likewise have a two-sided design, comprising continuous-flow conveyors 8 arranged on both sides of the transport unit 2. However, a transport track 3 can also comprise one-sided and two-sided track sections. As a result of a two-sided design, transfer points or switches can be implemented, for example, at which the transport unit 2 can be transferred from a one-sided track section to a subsequent opposite one-sided track section in the transverse direction. Such transfer points are known from AT 517219 B1, for example. However, a two-sided transport track 3 can also be advantageous, for example, for transporting heavy loads on uphill grades, since the cooperation between drive magnets 6 and drive coils 5 on both sides allows a higher propulsive force to be exerted on the transport unit 2.

What is claimed:
1. A transport device, comprising:
at least one transport unit; and
a transport track comprising a plurality of transport segments arranged consecutively in the longitudinal direction to form a long stator linear motor, having a starting point and an ending point, along which the at least one transport unit can be moved in the longitudinal direction along a movement path predefined by the transport segments,
the plurality of transport segments comprising at least one curved transport segment having a curved movement path that is located in a two-dimensional plane, the two-dimensional plane defining a movement plane in which the at least one transport unit can be moved along an entirety of the transport track,
a transition segment including a continuous-flow conveyor having a longitudinal axis, adjoining the starting point or the ending point of the transport track in the longitudinal direction, for transporting the at least one transport unit in a direction of movement extending along the longitudinal axis,
wherein the continuous-flow conveyor is provided to move the at least one transport unit in the direction of movement at least sectionally in a conveying plane deviating from the movement plane of the transport track, and
wherein a steady transition between the movement plane of the transport track and the conveying plane of the continuous-flow conveyor is provided for a movement of the at least one transport unit without jerk in the region between the transport track and the transition segment.

2. The transport device according to claim 1, wherein the conveying plane in the direction of the longitudinal axis of the continuous-flow conveyor is parallel to the movement plane at least sectionally.

3. The transport device according to claim 1, wherein the conveying plane is rotated in the direction of movement at least sectionally by a certain rotational angle about the longitudinal axis of the continuous-flow conveyor.

4. The transport device according to claim 2, wherein the longitudinal axis of the continuous-flow conveyor comprises at least one of a straight section or a curve section.

5. The transport device according to claim 4, wherein the curve section is at least sectionally curved about an axis of curvature that is normal to the longitudinal axis.

6. The transport device according to claim 1, wherein the longitudinal axis of the continuous-flow conveyor has a continuous course of curvature for the movement of the at least one transport unit without jerk along the continuous-flow conveyor.

7. The transport device according to claim 1, wherein at least one further transition segment including a continuous-flow conveyor is provided adjoining the transition segment in the direction of movement.

8. The transport device according to claim 1, wherein the starting point or the ending point of the transport track, or a starting point or an ending point of a further transport track adjoins the transition segment in the direction of movement.

9. The transport device according to claim 1, wherein the continuous-flow conveyor comprises at least one holding device for holding the at least one transport unit on the continuous-flow conveyor in one of a force-fit or form-locked manner.

10. The transport device according to claim 9, wherein the at least one holding device has ferromagnetic properties and cooperates with drive magnets of the at least one transport unit so as to hold the at least one transport unit in a force-fit manner.

11. The transport device according to claim 9, wherein the at least one holding device comprises at least one receiving unit, which cooperates with at least one corresponding receiving element arranged on the at least one transport unit so as to hold the at least one transport unit on the continuous-flow conveyor in a form-locked manner.

12. The transport device according to claim 1, wherein drive coils, which are arranged at a distance from one another in the longitudinal direction and of which each has a coil axis, are arranged on the transport segments, and wherein the coil axes of all drive coils of all transport segments of the transport track being located in a shared two-dimensional coil plane that one of: corresponds to the movement plane of the transport track or is arranged parallel to the movement plane of the transport track.

* * * * *